E. A. MOREE.
FISH LURE.
APPLICATION FILED DEC. 15, 1920.
1,390,458.
Patented Sept. 13, 1921.
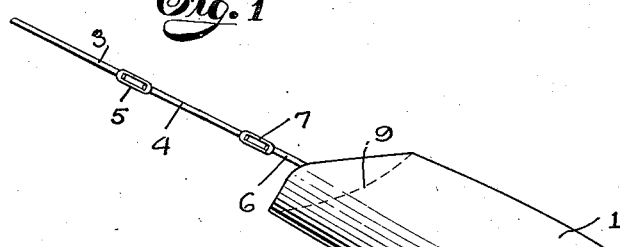
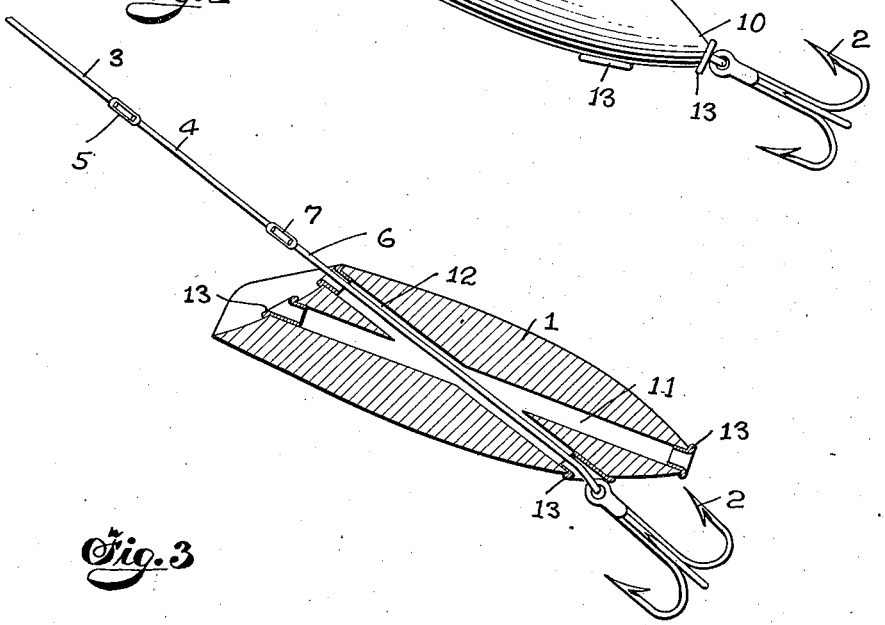
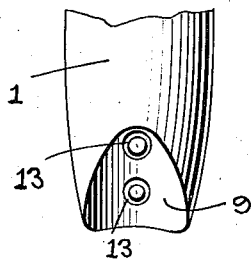
Inventor
Edward A. Moree
By his Attorneys
Emery Varney Blair & Hoguet

UNITED STATES PATENT OFFICE.

EDWARD A. MOREE, OF NEW YORK, N. Y.

FISH-LURE.

1,390,458.

Specification of Letters Patent.  Patented Sept. 13, 1921.

Application filed December 15, 1920. Serial No. 430,832.

*To all whom it may concern:*

Be it known that I, EDWARD A. MOREE, a citizen of the United States, and a resident of the borough of Manhattan, city, county, and State of New York, have invented an Improvement in Fish-Lures, of which the following is a specification.

This invention relates to fishing tackle and particularly to artificial fish lure which may be employed in casting and trolling.

One of the objects of this invention is to provide a buoyant fish lure which has the hooks therefor directly connected to and responsive to the angler's line, and which has the body of said lure so constructed that upon movement it is automatically carried beneath the surface of the water to variable predetermined depths. Other objects of the invention will be apparent from the following description.

An illustrative embodiment of this invention is shown in the drawing, wherein—

Figure 1 is a perspective view of a fish lure with an attached fishing line held therein on the longitudinal axis of the lure body;

Fig. 2 is a longitudinal sectional view of the body of the lure showing a part of a concaved surface and the fishing line held at an angle to the longitudinal axis; and Fig. 3 is a top plan view of the forward end of the lure showing the concaved surface.

Heretofore in the art of fishing, the fish hooks have been positively attached to the body of the lure or have been maintained positively in contact therewith. Such arrangements have the disadvantages of permitting the fish, after being hooked, to disengage itself by carrying the lure into contact with obstacles, such as weeds, sunken logs, and the like, and employing the lure as a lever to tear the hooks from its mouth; and in the case where the fish is only partially hooked, the rush of the lure through the water causes it to act as a lever to disengage the hooks. A disadvantage of having the hooks directly attached to the body of the lure is that there is lost motion between the angler's line and the hooks and when the fish strikes and feels the non-give of the body, it immediately lets go before the angler has received the indication and has hooked the fish. The aforementioned difficulties have been overcome by providing a means for attaching the hooks directly to the angler's line and for having the line associated with the lure so that at the time the fish strikes the angler receives the indication and is enabled to hook the fish. Further, the hook is capable of movement away from the body of the lure as the fish darts away in a direction opposite to its retention and it is thus deprived of a lever by which it may disengage itself from the hook.

Referring to the drawings, the form of lure conveniently chosen to illustrate the invention consists of a cylindrical body 1 and a hook 2 which is normally held against that body and is attached to angler's line 3 in a suitable manner, as by a snell 4, swivel 5, a short intermediate line 6, and swivel 7. The body may be constructed of any desired material and in any desired form, preferably however it is formed so that it is buoyant. In the body illustrated the buoyancy is obtained by making the body of wood or like material. This buoyant body is made to dive and move along beneath the water surface by so forming it that the rush of the water over the body will force it downward. One of the means for obtaining this result is by forming an inclined concave surface 9 on the forward end of the body as illustrated in Fig. 3. Preferably the axis of the curvature forms an angle with the longitudinal axis of the body. The other end of the body is preferably tapered as shown at 10.

A suitable means is employed to hold the body in contact with the line when the hooks are directly attached to the fishing line, and for this purpose the body is provided with bores 11 and 12 one of which holds the wire snell 4, and preferably the diameter of the bores permits the line and swivels to pass therethrough. For convenience the axis of bore 11 coincides with the longitudinal axis of the body and the bore 12 intersects bore 11 forming an angle therewith. The open ends of the bores are provided with eyelets 13 which provide against wear. The body and the bores have their surfaces covered with any desired waterproofing protecting material which is usually of light color so that the fish will be attracted by the lure as it moves through the water.

The depth to which the lure dives is preferably governed by the incline of the concaved surface and the position of the snell in the body. When the snell is placed in bore 11, the lure will move at a shallow depth beneath the surface; and when placed in bore 12, will move at a considerably greater depth; and when placed partly in bore 11 and partly in bore 12, it takes a medium depth. It is to be understood that the angle which the axis of the concaved surface forms with the longitudinal axis of the body may be varied to increase or decrease the depth of diving and also that the positions of the bores in the body may be varied.

By having the hooks directly attached to the angler's line and having the body of the lure capable of movement along the line, the hooks under normal operation will be held in contact with the body. When a fish has been hooked its natural tendency is to dart away in a direction opposite to its retention and at that time the hook is moved away from the body and the fishing line is drawn therethrough, and the fish then proceeds unimpeded by the body of the lure through weeds and among the sunken logs and is thus prevented from disengaging the hooks from its mouth by employing the lure as a lever. Also, the fish, unimpeded by the lure body, is permitted to fight to its fullest extent. The buoyancy of the body tends to bring the body to the surface of the water thus holding the line out of engagement with obstacles. Preferably the hook 2 is formed with three prongs, but may, however, have only a single prong; also, the single hook may be substituted, if desired, by a plurality of small hooks attached to the end of the snell.

This invention may be variously embodied and the particular form of invention herein shown may be varied within the scope of the subjoined claims.

I claim:

1. A fish lure comprising a body having means for causing it to dive when drawn through water, a hook normally held in contact with said body and capable of movement therefrom, and a snell attached to said hook and to a fishing line and associated with said body to partially counteract the diving of said body.

2. A fish lure comprising a body provided with an inclined concaved surface on its forward end for causing said lure to dive as it is moved through water, a hook normally held in contact with said body, and a snell directly attached to said hook and to a fishing line and associated with said body in a manner to assist or oppose the diving thereof and to permit said hook and snell to be moved relative to said body.

3. A fish lure comprising a cylindrical body provided with a plurality of bores and an inclined curved surface to move said body below the water surface as the body is drawn therethrough, a hook normally engaging said body, and a snell attached to said hook and passing through said body and longitudinally movable thereto, the position of said snell in said body coöperating with the inclined surface for governing the depth of said lure beneath the water surface.

4. A fish lure comprising a cylindrical buoyant body having a bore therethrough and its front end provided with an inclined concaved surface for causing said body to be moved beneath the water surface, and a hook normally held in contact with said body by a snell passing through said bore and swivelly connected to a fishing line, said hook capable of movement away from said body and in so moving drawing said fishing line through said bore.

5. A fish lure comprising a waterproof body having two intersecting bores therein and having an inclined surface for causing said body to dive when drawn through the water, a hook held in contact with said body and movable therefrom, and a snell attached to said hook and to a fishing line by means of a swivel, said snell held in one of said bores to assist said lure to dive and held in the other bore to oppose the diving of said lure, and held partly in one bore and partly in the other bore to cause said lure to move to medium depth below the water surface.

6. A fish lure comprising a cylindrical waterproof buoyant body having a bore therethrough coinciding with the longitudinal axis of said body and another bore at an angle to the first bore and intersecting the same, said body also having one end tapered and the other end provided with an inclined concaved surface for causing said body to dive, the axis of said concaved surface being at an angle to the longitudinal axis of said body, eyelets in the ends of said bores, a wire snell held in one of said bores and swivelly connected to a fishing line, and a hook attached to the other end of said snell and normally held in contact with said body and capable of movement away from said body.

In testimony whereof I have signed my name to this specification this 14th day of December, 1920.

EDWARD A. MOREE.